June 19, 1951 R. L. SNYDER, JR 2,557,480

SELECTOR SWITCHING APPARATUS

Filed Oct. 2, 1947 2 Sheets-Sheet 1

INVENTOR.
Richard Lee Snyder Jr.
BY
Howson & Howson
Attys.

SELECTOR SWITCHING APPARATUS

Filed Oct. 2, 1947

2 Sheets-Sheet 2

INVENTOR.
Richard Lee Snyder Jr.
BY
Howson & Howson
Attys.

Patented June 19, 1951

2,557,480

UNITED STATES PATENT OFFICE 2,557,480

SELECTOR SWITCHING APPARATUS

Richard L. Snyder, Jr., Glassboro, N. J.

Application October 2, 1947, Serial No. 777,440

10 Claims. (Cl. 200—5)

This invention relates to selective switching devices, and more particularly to such devices as are operable by manually selective elements, as in the push-button tuning of radio and television receivers.

One object of the invention is to provide an improved selective switching apparatus which is novelly characterized in that the selective switching action is effected by means of a member arranged for translatory movement. In its broad aspect, the invention contemplates the selective movement of such member, by means of manually-selective elements, to various positions.

The invention further relates to coil switching devices for use in television receivers.

In switching high frequency electrical circuits, such as those found at radio frequency inputs of television receivers, it is generally necessary that the conductors to and from the components being switched be kept as short as possible. This is necessary because the inductance and capacity of long leads are comparable to those of the switched elements and therefore cause the influence of the latter to be diminished. Usually the elements being switched are coils. This is so because the wiring and tube capacitance is so great that, at these frequencies, the gain of the systems is limited by capacity and only inductance need be varied.

One method of keeping the leads to all switched elements short is to place the fixed elements in the circuit near the fixed switch contacts and then bring the elements with their contacts to a position which permits the contacts to engage. This is done with rotary switches, but a rotary switch action is difficult to couple to push-buttons. It furthermore has the disadvantage that if more than one set of coils are used it is very difficult, if not impossible, to provide means for adjusting individual coils.

Another object of the present invention is to provide an improved coil switching device which combines the advantages of a rotary device with push-button operation and easy coil adjustment.

Other objects and features of the invention will be apparent from the following detailed description with reference to the accompanying drawings, wherein Fig. 1 is a sectional plan view of a coil-switching apparatus constructed in accordance with the present invention, such view being taken along line 1—1 of Fig. 2;

Figures 1, 2, 15:
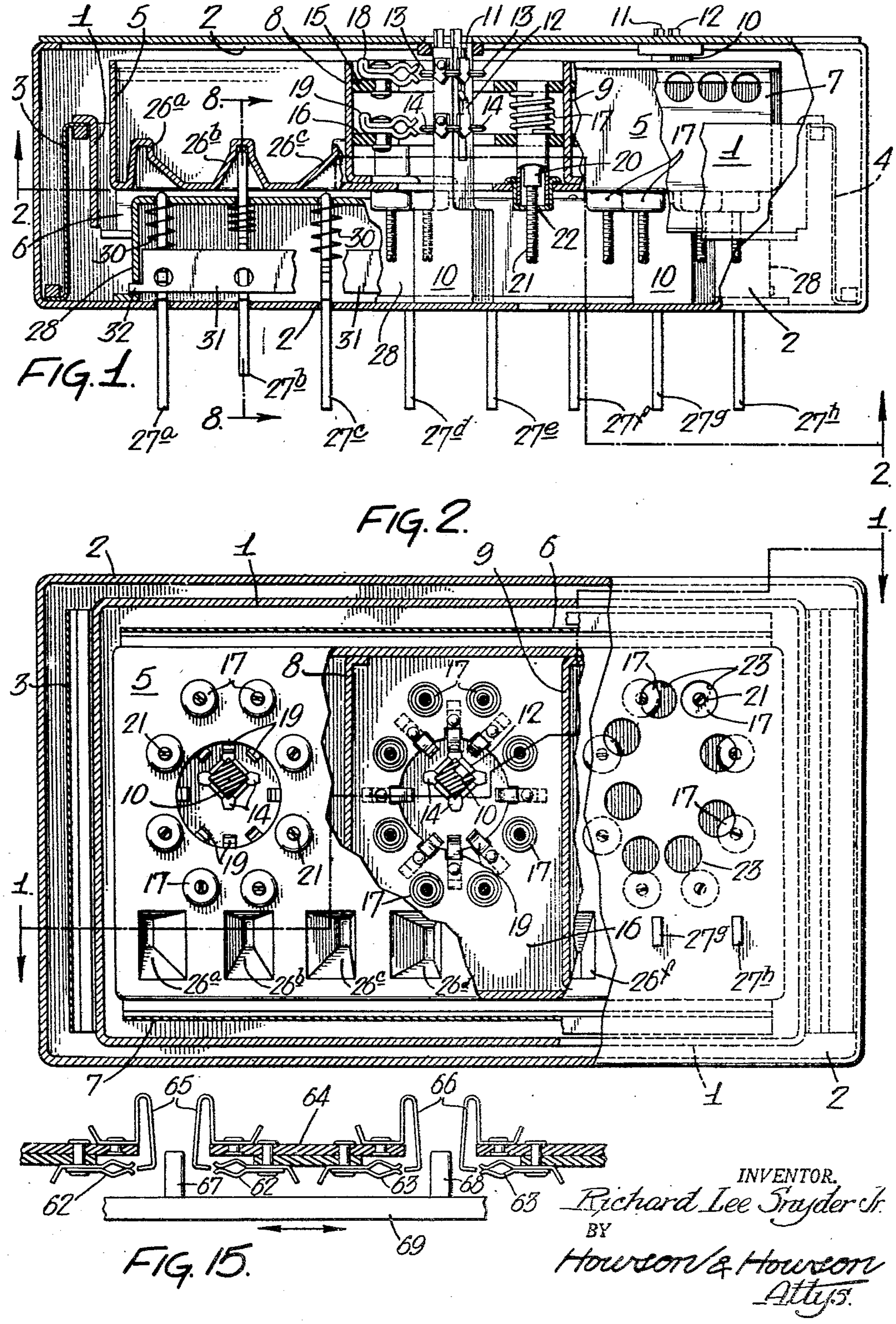
Fig. 2 is a part section and part elevational view taken along line 2—2 of Fig. 1.
Fig. 15 is a sectional illustration of another embodiment.

The switching apparatus provided according to this invention is novelly characterized by the employment of a member arranged for translatory movement in a plurality of different paths. The invention may best be described by first referring to Fig. 3 which is a more or less diagrammatic illustration of the structural arrangement employed. As shown in this illustration, a frame 1 is mounted on a stationary support 2 by means of resilient supporting elements 3 and 4 which are in the form of sheets of spring material disposed on opposite sides of the frame 1. This arrangement forms a parallelogram, as shown in Fig. 4, and since the spring elements 3 and 4 are flexible, the frame 1 can move back and forth along one path (i. e. it has one degree of freedom) remaining parallel to the base, but it cannot rotate. The dotted lines in Fig. 4 indicate the flexing movement of the spring elements which permit movement of the frame, as indicated by the double head arrow.

Referring back to Fig. 3, a second frame 5 is mounted on the first frame 1 by means of similar spring elements 6 and 7, arranged as shown. This mounting permits translatory movement of the frame 5 in a path at right angles to the path of permissible movement of the first frame. However, since the frame 5 is supported by the frame 1, the frame 5 is movable in two paths substantially at right angles to one another. In other words, this frame has two and only two degrees of freedom.

Figure 3:
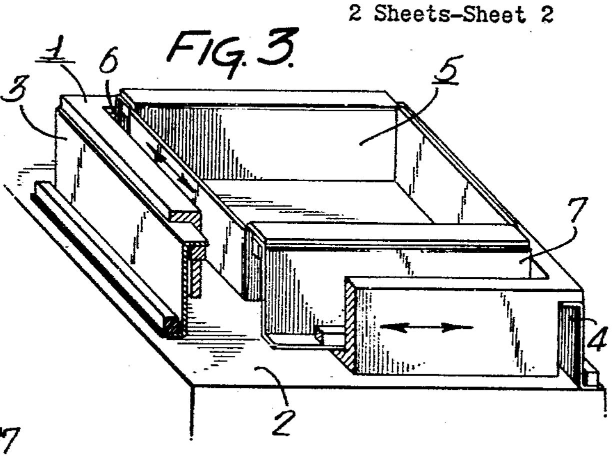
Fig. 3 is an explanatory perspective view illustrating the underlying principle of the invention.
Figure 4:
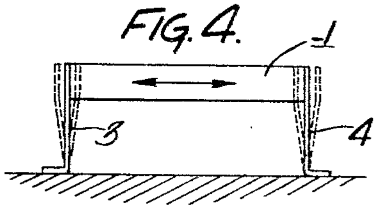
Fig. 4 is a supplemental explanatory view, the purpose of which is to better enable an explanation of the underlying principle.

Referring now to Figs. 1 and 2, there is illustrated a coil switching apparatus for a television receiver, which apparatus utilizes the principle and structural arrangement illustrated in Fig. 3. For clarity of illustration, the elements in Figs. 1 and 2 corresponding to those of Fig. 3 are similarly numbered. The casing 2 constitutes a stationary support, and the movable member or frame 5 is mounted on the casing for translatory movement in two paths substantially at right angles to one another, through the medium of the auxiliary frame 1. In the apparatus illustrated, there are three selector switches arranged for gang operation, but the invention is applicable to a single selector switch, as will be obvious from the subsequent description. Since all of the switches in the illustrated apparatus are similar in construction and operation, a detailed description of one of them will suffice. Reference is therefore made to the intermediate or central switch which is best illustrated in the figures.

It will be noted that the movable support 5 is provided with a pair of partitions 8 and 9 which serve to separate the several switches and which also serve to support some of the switch contacts. The intermediate or central switch is, of course, disposed between these partitions.

Referring specifically to the intermediate or central switch, a rigid support member 10 is fixedly secured to the casing 2 and carries contacts 11 and 12 which are arranged in spaced relation to one another. Each of these contacts has a number of radially-extending fingers 13 and 14. In the particular structure shown, there are four such fingers on each of the fixed contacts 11 and 12, as may be seen in Fig. 2.

A pair of spaced insulating plates 15 and 16 are supported by the partitions 8 and 9, and these plates serve to support a plurality of coils 17 and contacts 18 and 19. Preferably, each of the coils 17 is adapted to have its inductance varied by means of an adjustable magnetic core 20 disposed within the coil and carried by a screw 21 which is adjustably supported at 22. The casing 2 is provided with holes 23 to enable the individual adjustments of the coils.

As shown in Fig. 2, the coils 17 and contacts 18 and 19 are arranged in surrounding relation to the fixed contacts 11 and 12. The contacts 18 and 19 comprise pairs, each of which is associated with one of the coils, the ends of each coil being connected to the associated pair of contacts. It will be obvious that by this arrangement, it is possible to have the connecting leads as short as desired.

The contacts 18 and 19 are provided with inwardly-extending gripping fingers 24 and 25 which are adapted to receive the fingers 13 and 14 of the fixed contacts 11 and 12. By effecting various amounts of translational movement of the movable frame or support 5 in its two degrees of freedom, the contacts 18 and 19 are selectively engaged with the contacts 11 and 12. By causing certain predetermined translational movements of the movable support 5, a single pair of the contacts 18 and 19 is caused to engage the contacts 11 and 12 for each particular movement of the support 5. The provision of the radially-extending fingers 13 and 14 on the fixed contacts 11 and 12 is to enable this mode of operation. It will be understood, of course, that different ones of these fingers will be engaged during different operations of the device. With the contacts 11 and 12 connected to a circuit to which it is desired to selectively connect the coils 17, it will be apparent that the above-mentioned selective switching operation will cause the coils to be selectively connected to said circuit.

In the form of the apparatus illustrated in Figs. 1 and 2, the different translatory movements of the movable support 5 are effected by means of two dimensional cams 26a, 26b, etc. in the form of differently shaped pyramidal receptacles provided on the movable support 5 and adapted to receive the ends of associated push-rods 27a, 27b, etc. The depression of a particular push-rod causes certain translatory movement of the movable support 5 to cause a certain pair of the contacts 18 and 19 to engage the fixed contacts 11 and 12, thus connecting one of the coils 17 to the circuit which is being controlled by the device.

Figure 8:
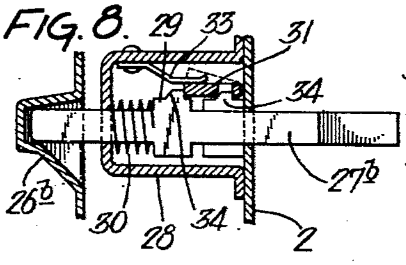
Fig. 8 is a sectional view taken along line 8—8 of Fig. 1.

The push-rods 27a, 27b, etc. are slidably supported by the front wall of casing 2 and by an auxiliary housing 28. As shown in Fig. 8, each push-rod has an enlargement 29 which forms an abutment for a spring 30, the latter urging the push-rod to its outer position. A latch bar 31 is pivoted at 32 and is urged toward the push-rods by a leaf-spring 33. Each push-rod has a latch portion 34 on the enlargement thereof for cooperation with the latch bar 31. When one of the push-rods is depressed, it cams the latch bar outwardly and, upon reaching its fully depressed position, the rod is latched by the latch bar. Upon subsequent depression of another push-rod, the first one is released and the second one is latched in its depressed position. Such a latching and releasing arrangement is commonly employed in push-button tuners for radio receivers and will be well understood by those skilled in the art.

It will be apparent from the foregoing description that while the frame 5 has only two degrees of freedom, it is movable translationally in numerous paths. In the specific illustration there are eight push-rods and eight cams, and the frame is movable to eight positions to select any one of the eight coils shown.

Various possible modifications of the apparatus will be apparent. With respect to the arrangement of the switch contacts and coils, it will be obvious that the coils and associate contacts could be fixedly mounted in a central position, and the other contacts could be arranged on the movable support for translatory movement, as above described. This would merely involve a reversal of the stationary and movable elements and such modification of the structure as might be necessary to effect such reversal.

Figure 5:
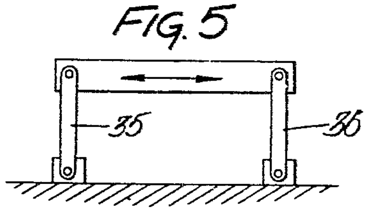
Figs. 5 to 7 are illustrations of different ways in which the principle of the invention may be applied.
Figures 6, 7:
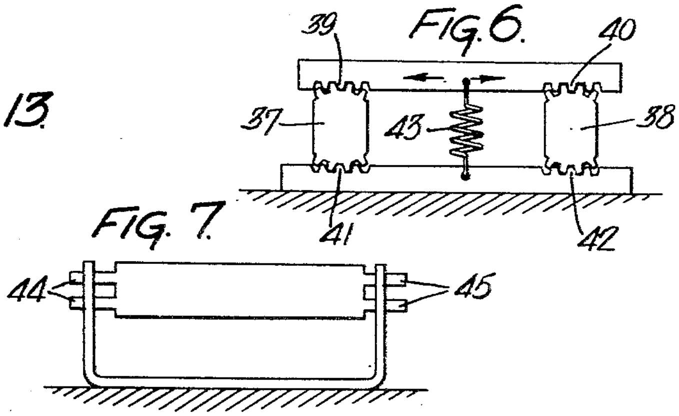

The mounting of the movable frame or support 5 may also be varied, as indicated in Figs. 5 to 7. In Fig. 5, the supporting springs are replaced by pivoted connecting rods 34 and 36. Two rods may be used at each end of the supported member, and to insure stiffness the two rods at each end may be rigidly fastened to one another. In Fig. 6, gear segments 37 and 38 are shown in conjunction with gear racks 39, 40 and 41, 42 provided on the supported member and the supporting member respectively. Two gears may be used at each end rigidly fastened together. A spring 43 may be employed to hold the assembly together. In Fig. 7, a simple sliding arrangement is shown, wherein elements 44 and 45 on the supported member are slidable on the supporting member.

It will be seen that the various arrangements of Figs. 4 to 7 give different types of translational movement of the supported member. In Figs. 6 and 7 the movement is rectilinear, while in Figs. 4 and 5 the translational movement of the supported member is in a curved path.

Figure 9:
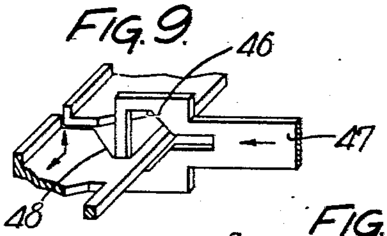
Figs. 9 to 13 are illustrations of different structures which may be employed to effect the desired movement of the principal movable member of the apparatus.
Figure 10:
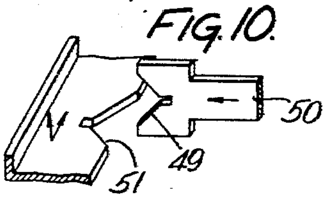

The camming arrangement for actuating the movable support 5 in response to actuation of the push-rods may also be modified. In Figs. 9 and 10, there are shown two-dimensional combinations of single-dimensional cams. In Fig. 9, the cam portion 46 on the end of the push-rod 47 is interlinked with the cam 48 on the member to be moved. In Fig. 10, the arrangement is substantially similar but the elements are not interlinked, the cam portion 49 on rod 50 cooperating with the cam portion 51 on the member to be moved. In either case, the movement of the movable member is determined by coaction of the inclined cam edges as the cam members are brought into fully engaged relation with one another.

Figure 11:
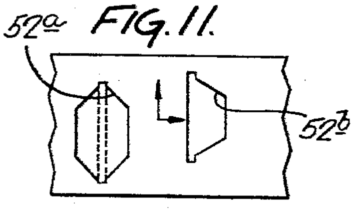
Figure 12:
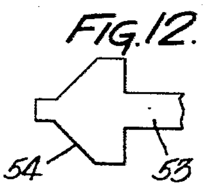

Figs. 11 and 12 show a further modification of the camming structure. The member to be moved is provided with openings 52*a*, 52*b*, etc. and the push-rods are adapted to cooperate with said openings. Thus, the push-rod 53 has a cam portion 54 with inclined edges that cooperate with the inclined edges of one of said openings.

Figure 13:
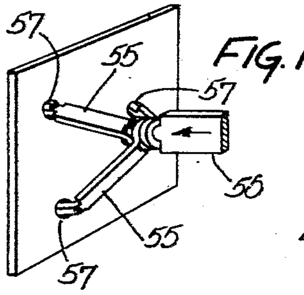

Another arrangement for moving the movable member is shown in Fig. 13. In this instance, three links 55 are flexibly fastened to the end of the push-rod 56 to form a tripod. The extremity of each link is smaller than the rest of the link, forming a shoulder thereon. The extremities of the links are disposed in openings 57 of the moving frame. When the rod is withdrawn, the ends of the links fit loosely in the openings 57. When the push-rod is depressed, the ends of the links move inwardly until the shoulders stop them. This forces the movable frame to move until all of the shoulders touch.

Figure 14:
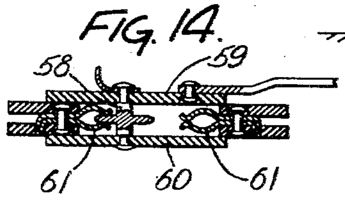
Fig. 14 is a sectional view illustrating a contact structure which may be employed.

Fig. 14 shows a construction of the switch contacts which may be employed. In this instance, the fixed contact stud 58 has a pair of spaced insulating plates 59 and 60 associated therewith, and the moving contacts 61 are interposed between said plates. This arrangement has the advantage that the contacts are self-aligning.

Fig. 15 shows a modification of the selective switching device in which translational movement of an actuator effects the selective switching operation. In this instance, contacts 62 and 63 are mounted on a stationary support 64, and associated spring contacts 65 and 66 are also mounted on said support. The pins 67 and 68 on the movable member 69 effect corresponding selective engagement of the cooperating contacts according to the translational movement of said member. If the elements, e. g. coils to be selected are connected to pairs of the contacts 65 and 66, and if the contacts 62 are all connected to one circuit lead and contacts 63 are all connected to another circuit lead, the selective switching action will selectively connect the said elements to the circuit.

It is important to note that the present invention not only enables the use of short connections to the coils being switched, but it also enables easy individual adjustment of the coils. As may be seen in Fig. 2, the holes 23 in the casing 2 are located so that when a particular coil is selected (by movement of frame 5), that coil is aligned with one of said holes, and the adjusting screw 21 for that coil is easily accessible through said hole by means of a screw driver.

It will be noted also that operating principle of the invention, i. e. the effectuation of switching by translatory movement of a member, is well adapted for push-button control.

From the foregoing description it will be apparent that the invention is capable of various forms of physical expression and is not limited to any particular form. Moreover, while the invention is particularly directed to coil switching in the tuning of television receivers, it is applicable generally to selective switching.

I claim:

1. Selector switching apparatus, comprising stationary support means, movable support means, means mounting said movable means on said stationary support means for translatory movement in a plurality of paths, selectable contacts carried by one of said support means, contact means carried by the other support means for selective engagement with said contacts according to the movement of said movable support means, and means including a plurality of manually-operable selector elements for effecting movement of said movable support means so as to cause selective engagement of said contacts according to the selector element actuated in any instance.

2. Selector switching apparatus, comprising stationary support means, movable support means, means mounting said movable means on said stationary support means for translatory movement in two paths, a plurality of selectable contacts carried by one of said support means, contact means carried by the other support means for selective engagement with said contacts according to the translatory movement of said movable support means, and means including a plurality of manually-operable selector elements for effecting different translatory movements of said movable support means so as to cause selective engagement of said contacts according to the selector element actuated in any instance.

3. Selector switching apparatus, comprising stationary support means, movable support means, means mounting said movable means on said stationary support means for translatory movement in two paths, a plurality of selectable contacts carried by one of said support means, contact means carried by the other support means for selective engagement with said contacts according to the translatory movement of said movable support means, a plurality of manually-operable push elements, and cam means operable by the respective push elements to effect translatory movement of said movable support means according to the push elements actuated in any instance, so as to cause selective engagement of said contacts according to the selected push element.

4. Selector switching apparatus, comprising a stationary support, a first movable member, means mounting said member on said support for translatory movement in one path, a second movable member, means mounting said second member on said first member for translatory movement of the second member relative to the first member in a path different from the first-mentioned path, whereby said second member is capable of translatory movement relative to said support in both of the aforementioned paths, contact means fixedly mounted on said support, contact means carried by said second member for engagement with said first contact means, one of said contact means including contacts arranged for selective engagement by the other contact means depending upon the positioning of said second member in any instance, and means including a plurality of manually-operable selector elements for effecting movement of said second member so as to cause selective engagement of said contacts according to the selector element actuated in any instance.

5. Selector switching apparatus, comprising a stationary support, a first movable member.

means mounting said member on said support for translatory movement in one path, a second movable member, means mounting said second member on said first member for translatory movement of the second member relative to the first member in a path different from the first-mentioned path, whereby said second member is capable of translatory movement relative to said support in both of the aforementioned paths, contact means fixedly mounted on said support, contact means carried by said second member for engagement with said first contact means, one of said contact means including contacts arranged for selective engagement by the other contact means depending upon the positioning of said second member in any instance, a plurality of manually-operable push elements, and cam means on said second member engageable by said push elements to effect movement of said second member according to the push element actuated in any instance, so as to cause selective engagement of said contacts according to the selected push element.

6. Selector switching apparatus, comprising a stationary support, a first movable member, means mounting said member on said support for translatory movement in one path, a second movable member, means mounting said second member on said first member for translatory movement of the second member relative to the first member in a path different from the first-mentioned path, whereby said second member is capable of translatory movement relative to said support in both of the aforementioned paths, contact means fixedly mounted on said support, a plurality of contacts arranged on said second member in surrounding relation to said contact means for selective engagement with the latter depending upon the positioning of said second member in any instance, and means including a plurality of manually-operable selector elements for effecting movement of said second member so as to cause selective engagement of said contacts according to the selector element actuated in any instance.

7. Selector switching apparatus, comprising a stationary support, a first movable member, means mounting said member on said support for translatory movement in one path, a second movable member, means mounting said second member on said first member for translatory movement of the second member relative to the first member in a path different from the first-mentioned path, whereby said second member is capable of translatory movement relative to said support in both of the aforementioned paths, contact means fixedly mounted on said support, a plurality of contacts arranged on said second member in surrounding relation to said contact means for selective engagement with the latter depending upon the positioning of said second member in any instance, a plurality of manually-operable push elements, and cam means on said second member engageable by said push elements to effect movement of said second member according to the push element actuated in any instance, so as to cause selective engagement of said contacts according to the selected push element.

8. In a selective switching apparatus, stationary contact means, movable contact means surrounding said stationary contact means and having freedom of translational motion in at least two directions substantially in the same plane, one of said contact means comprising a plurality of spaced contact elements, and manually-operable means for effecting translatory movement of said movable contact means to different preselected positions so as to cause selective engagement of said contact elements with the other of said contact means.

9. In a selective switching apparatus, stationary contact means, movable contact means surrounding said stationary contact means and having freedom of translational motion in at least two directions substantially in the same plane, said movable contact means comprising a plurality of spaced contact elements, and manually-operable means for effecting translatory movement of said movable contact means to different preselected positions so as to cause selective engagement of said contact elements with said stationary contact means.

10. An electrical control device, comprising stationary support means, movable support means arranged for translatory movement in a plurality of angularly-related substantially coplanar paths, manually-operable means for actuating said movable support means, and mutually cooperative contact means arranged on the respective support means to effect contacting action according to the movement of said movable support means by said manually-operable means.

RICHARD L. SNYDER, Jr.

REFERENCES CITED

The following references are of record in the file of this patent:

UNITED STATES PATENTS

| Number | Name | Date |
|---|---|---|
| 941,428 | Merrill | Nov. 30, 1909 |
| 1,158,083 | Stout | Oct. 26, 1915 |
| 1,999,313 | Alexonis | Apr. 30, 1935 |
| 2,064,828 | Grohsgal | Dec. 22, 1936 |
| 2,196,443 | Allison | Apr. 9, 1940 |
| 2,213,845 | Mastney | Sept. 3, 1940 |
| 2,354,779 | Smessaert | Aug. 1, 1944 |
| 2,432,476 | Hesse | Dec. 9, 1947 |
| 2,443,635 | Morris | June 22, 1948 |
| 2,475,647 | Spriggs | July 12, 1949 |